United States Patent [19]

LaDuke et al.

[11] Patent Number: 5,044,730
[45] Date of Patent: Sep. 3, 1991

[54] COLOR CHANGING DEVICE

[75] Inventors: Thomas F. LaDuke, Buena Park; Joel D. Gruber, Laguna Niguel; Richard Romano, Morgan Hill, all of Calif.

[73] Assignee: Artifex Corporation, Santa Ana, Calif.

[21] Appl. No.: 307,889

[22] Filed: Feb. 8, 1989

[51] Int. Cl.$^5$ .......................... G02B 27/14; G02B 5/22
[52] U.S. Cl. ..................................... 359/890; 359/891; 359/634
[58] Field of Search ................ 350/316-318, 350/407, 408, 272, 311-315, 321, 172-174, 320; 354/100-103; 353/28-32; 356/404, 416, 420; 362/277, 286, 222, 284; 358/17, 55; 351/205

[56] References Cited

U.S. PATENT DOCUMENTS

| | | | |
|---|---|---|---|
| 3,639,039 | 2/1972 | Rhodes | 350/272 |
| 3,667,841 | 3/1970 | Ross | 354/103 |
| 3,704,061 | 11/1972 | Travis | 354/100 |
| 3,765,742 | 10/1973 | Walles | 350/6.1 |
| 3,895,854 | 7/1975 | Ziffer | 350/511 |
| 4,127,322 | 11/1978 | Jacobson et al. | 353/31 |
| 4,191,456 | 3/1980 | Hong et al. | 353/31 |
| 4,230,408 | 10/1980 | Nigg | 354/103 |
| 4,392,187 | 7/1983 | Bornhorst | 362/85 |
| 4,435,047 | 3/1984 | Fergason | 350/334 |
| 4,460,943 | 7/1984 | Callahan | 362/268 |
| 4,629,298 | 12/1986 | Trumbull et al. | 353/28 |
| 4,679,069 | 7/1987 | Andrea | 353/30 |
| 4,702,548 | 10/1987 | Tanaka et al. | 350/316 |
| 4,707,080 | 11/1987 | Fergason | 350/334 |
| 4,796,989 | 1/1989 | Fukuma et al. | 351/205 |

OTHER PUBLICATIONS

J. William Doane, John L. West; "Low-Loss High-Intensity Color Projection", SID 88 Digest; pp. 227–230.
J. William Doane, John L. West; "High-Intensity Color Projection for Automotive Displays": SPIE vol. 958 Automotive Displays and Industrial Illumination (1988); pp. 94–98.

Primary Examiner—Bruce Y. Arnold
Assistant Examiner—Thong Nguyen
Attorney, Agent, or Firm—Harness, Dickey & Pierce

[57] ABSTRACT

The present invention is a device for generating a plurality of colors of light from a light source. The device includes a plurality of filters to separate the light at predetermined wavelengths and to recombine them at different amplitudes to generate a predetermined color hue in the visible spectrum of light.

14 Claims, 1 Drawing Sheet

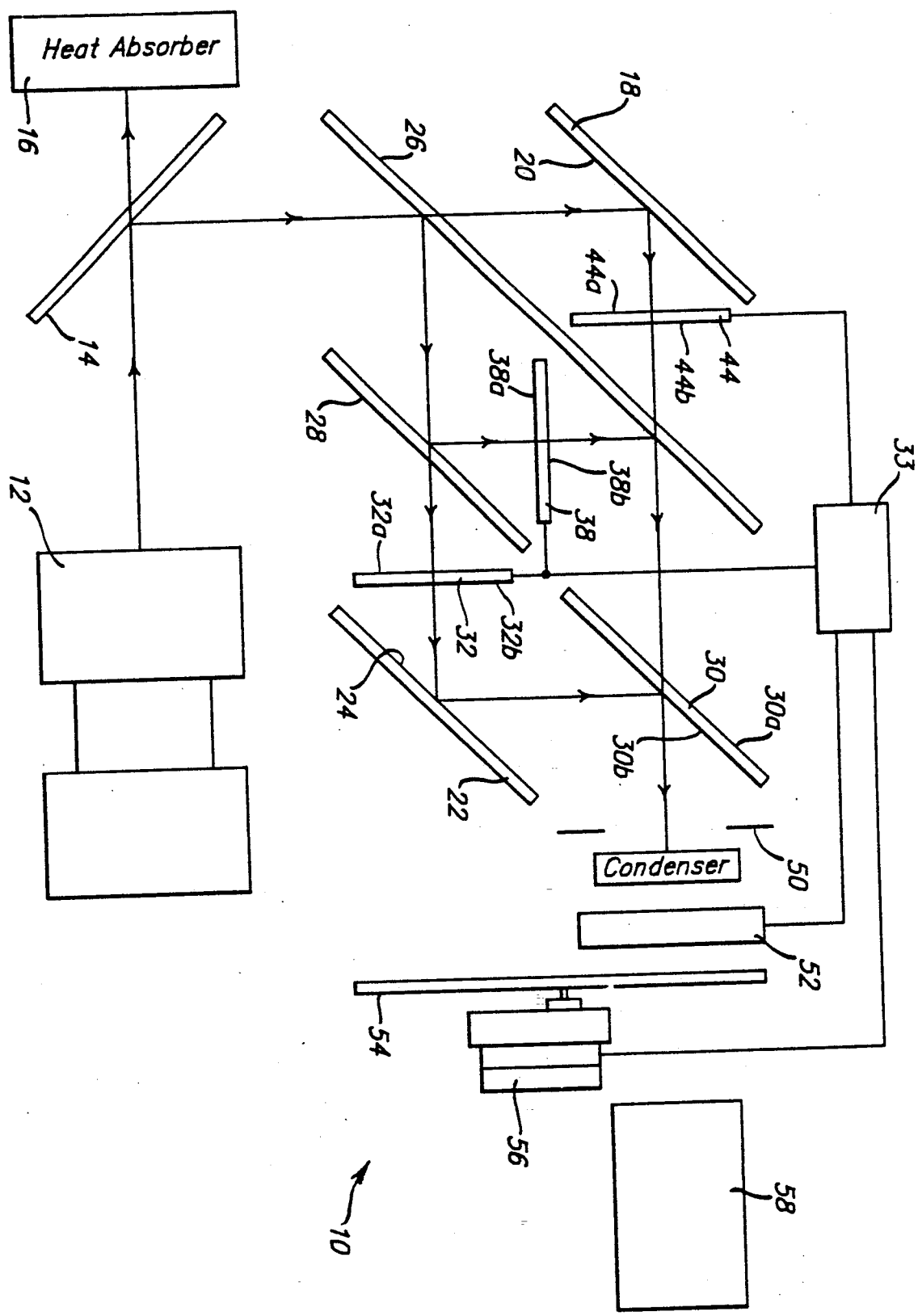

COLOR CHANGING DEVICE

BACKGROUND OF THE INVENTION

1. Field of the Invention

The present invention relates generally to generating color hues, more particularly to an apparatus for generating various hues of color in the visible spectrum.

2. Description of Related Art

Presently, there exists devices for changing the color or generating various color hues of light. Typically, a device for generating a color hue includes rotating dichroics operated by servomotors. The dichroics are placed vertical in the optical path of the light and rotated by the servomotors to obtain the color desired.

One problem with the above device is that it requires motors to rotate the dichroics. Another problem is that feedback loops and the like must be used to control the rotation of the dichroics, making it complex. Both of these problems result in an expensive color changing device.

It is one object of the present invention to provide a totally solid state color changing device. It is another object of the present invention to provide non-moveable dichroics. It is a further object of the present invention to eliminate the use of motors and complex controls. It is a still further advantage of the present invention to provide an inexpensive color changing device.

SUMMARY OF THE INVENTION

Accordingly, the present invention is a device for generating a plurality of colors of light from a light source. The device includes a plurality of filters to separate the light at predetermined wavelengths and to recombine them at different amplitudes to generate a predetermined color hue in the visible spectrum of light.

One advantage of the present invention is that the device is totally solid state. Another advantage of the present invention is that non-moveable parts are used. A further advantage of the present invention is that the focal lengths of the light paths are the same or equidistant. Another advantage of the present invention is that a single optical path and light source are used for attenuating the dichroics.

Other advantages of the present invention will be readily appreciated as the same becomes better understood by reference to the following detailed description when considered in connection with the accompanying drawing.

BRIEF DESCRIPTION OF THE DRAWINGS

FIG. 1 is a schematic view of the color changing device according to the present invention.

DESCRIPTION OF THE PREFERRED EMBODIMENT

Referring to FIG. 1, a color changing device 10 according to the present invention is shown. The device 10 includes a light source 12 for generating a light beam. A typical light source 12 could be a 1000 watt xenon light source. The light beam travels from the light source 12 to a first mirror 14. The first mirror 14 is an infrared transmitting cool mirror which transmits greater than ninety (90) percent of all light with a wavelength of eight hundred (800) nanometers or greater. The first mirror 14 is placed in the optical path of the light beam from the light source 12 at a forty-five (45) degree angle of incidence. A heat absorber or sink 16 is placed behind the first mirror 14 to absorb the infrared light passing through the first mirror 14, while the remaining light is reflected by the first mirror 14.

The device 10 includes a second mirror 18 spaced orthogonally or laterally from the first mirror 14. The second mirror 18 has a reflecting surface 20 coated with aluminum having a wavefront deformation of $\lambda/10$ or better. The aluminum is also coated with silicon dioxide. This produces better than ninety-five (95) percent reflection of light with a wavelength from six hundred (600) to seven hundred (700) nanometers. The second mirror 18 is placed in the optical path of the light beam from the first mirror 14 at a forty-five (45) degree angle of incidence. A third mirror 22 having a reflecting surface 24 is disposed between the first and second mirrors and spaced axially therefrom. The third mirror 22 is similar to the second mirror 18 and is placed in the optical path at a forty-five (45) degree angle of incidence to a light beam directed at it.

The device 10 also includes a first filter 26 orthogonally or laterally spaced between the first mirror 14 and the second mirror 18. The first filter 26 is placed in the optical path of the light beam from the first mirror 14 at a forty-five (45) degree angle of incidence. The first filter 26 is a red transmission/cyan reflecting filter or a forty-five (45) degree separation filter. The first filter 26 transmits greater than ninety-five (95) percent of the light with a wavelength between six hundred (600) and eight hundred (800) nanometers, and reflects ninety (90) percent of the light between four hundred (400) and six hundred (600) nanometers.

The device 10 further includes a second filter 28 spaced axially between the first filter 26 and third mirror 22. The second filter 28 is placed in the optical path of the light beam from the first filter 26 at a forty-five (45) degree angle of incidence. The second filter 28 is a blue reflecting or forty-five (45) degree long pass separation filter. When placed in the optical path of the light beam at a forty-five (45) degree angle of incidence, the second filter 28 transmits greater than ninety (90) percent of the light with a wavelength of five hundred (500) nanometers or longer.

The color changing device 10 also includes a third filter 30 spaced axially from the second mirror 18 and orthogonally or laterally from the third mirror 22. The third filter 30 is a red and blue transmission, green reflecting, red and green and blue combiner plate or filter. The third filter 30 has a first surface 30a and a second surface 30b. The first surface 30a has a broad band anti reflection coating and the second surface 30b is dichroic. When the third filter 30 is placed in the optical path of the light beam from either the second mirror 18 or third mirror 22 at a forty-five (45) degree angle of incidence, the third filter 30 transmits greater than ninety (90) percent of the wavelengths between four hundred (400) and five hundred (500) nanometers and greater than ninety (90) percent of the light having a wavelength between six hundred (600) and seven hundred (700) nanometers. The third filter 30 reflects greater than ninety (90) percent of the light having a wavelength between five hundred (500) and six hundred (600) nanometers.

The device 10 further includes a first modulation plate 32 disposed axially between the second filter 28 and third mirror 22. The first modulation plate 32 is a green modulation plate. The first modulation plate 32 is placed perpendicular to the light beam transmitted or passing through the second filter 28. The first modulation plate 32 has a first surface 32a with a dichroic coating and a second surface 32b with a liquid crystal. It should be appreciated that the liquid crystal is conventional and known in the art.

An electrical circuit 33 is connected to a current source (not shown) and the first modulation plate 32. When the first modulation plate 32 is placed in the optical path at a normal incidence with the first surface 32a of the dichroic coating facing the light source 12 and the second surface 32b of the liquid crystal laminated to the opposite side, the first modulation plate 32 transmits greater than eighty-five (85) percent of the light having a wavelength between five hundred (500) and six hundred (600) nanometers when a one hundred ten (110) volt A/C (alternating current signal) from the electrical circuit 33 is applied to the second surface 32b of the liquid crystal. When zero volts A/C is applied, the first modulation plate 32 allows less than five (5) percent of the light having a wavelength between five hundred (500) and six hundred (600) nanometers to exit the first modulation plate 32 at normal incidence, thereby giving a modulation depth greater than eighty (80) percent.

The device 10 includes a second modulation plate 38 disposed laterally between the second filter 28 and first filter 26. The second modulation plate 38 is blue modulation plate and is placed in the optical path at a normal incidence to the light reflected from the second filter 28. The second modulation plate 38 has a first surface 38a with a dichroic coating and a second surface 38b having a liquid crystal. The electrical circuit 33 is also connected to the second modulation plate 38. When the second modulation plate 38 is placed in the optical path at a normal incidence with the first surface 38a facing the light source 12, the second modulation plate 38 will transmit greater than eighty-five (85) percent of the light with a wavelength between four hundred (400) and five hundred (500) nanometers when a one hundred ten (110) volt A/C signal from the electrical circuit 33 is applied to the second surface 38b having the liquid crystal. When zero (0) volts A/C is the second modulation plate 38 allows less than five (5) percent of the light having a wavelength between four hundred (400) and five hundred (500) nanometers to exit the plate at normal incidence, thereby giving a modulation depth of greater than eighty (80) percent.

The device 10 also includes a third modulation plate 44 disposed between the second mirror 18 and the first filter 26. The third modulation plate 44 is a red modulation plate and is placed in the optical path at a normal incidence to the light reflected from the second mirror 18. The third modulation plate 44 has a first surface 44a with a dichroic coating and a second surface 44b having a liquid crystal. The electrical circuit 33 is also connected to the third modulation plate 44. When the third modulation plate 44 is placed in the optical path with a normal incidence with the first surface 44a facing the light source 12, the third modulation plate 44 will transmit greater than eighty-five (85) percent of the light having a wavelength of six hundred (600) and seven hundred (700) nanometers when a one hundred ten (110) volt A/C signal is applied to the second surface 44b having the liquid crystal. When zero (0) volts A/C is applied, the third modulation plate 44 allows less than five (5) percent of the light between six hundred (600) and seven hundred (700) nanometers to exit the plate at normal incidence, thereby giving a modulation depth of greater than eighty percent.

The color changing device 10 further includes a field stop 50 placed in the optical path at a normal incidence to the light reflected from the third filter 30. The field stop 50 is an aluminum plate with a one or two inch diameter aperture or hole (not shown) cut in the center, depending on the light source 12. The field stop 50 acts as a spatial filter to block off diffused light and allowing only collimated light to pass. The field stop 50 is fixed relative to the third filter 30. A condenser is axially spaced from the field stop 50.

The device 10 includes a moving gobo 52 spaced axially from the fixed field stop 50. The electrical circuit 33 is also connected to a liquid crystal of the moving gobo 52. The moving gobo 52 is a moving pattern/dyed liquid crystal in which sections of the pattern can be switched to clear or opaque by applying an electrical charge. This gives the effect of apertures opening and closing to control a beam of light. By sequencing the control of these apertures with the electrical circuit 33, the appearance of movement can be achieved.

The color changing device 10 includes a gobo plate 54 spaced axially from the moving gobo 52. The gobo plate 54 is a round plate attached to a servo motor 56 so as to index any one of a plurality, preferably six, apertures (not shown) of the gobo plate 54 in the optical path. Five of the apertures are loaded with aluminum deposited on glass pattern plates (not shown). The sixth position is an open aperture of one and one half inches in diameter. The servo motor 56 is connected to and controlled by the electrical circuit 33.

The device 10 further includes a zoom lens assembly 58. The zoom lens assembly 58 comprises an achromatized set of lenses (not shown), including one biconvex achromatic focus lens, one biconcave achromatic zoom lens and one biconvex output objecting lens. This zoom lens assembly 58 is utilized to project an image of either a section of the gobo plate 54 or the moving gobo 52. It should be appreciated that the zoom assembly is conventional and known in the art. It should also be appreciated that the necessary control activity could be made or purchased to perform the above functions.

In operation, the light source 12 generates a light beam which is projected onto the first mirror 14 allowing the infrared light to be passed through the first mirror 14 and be absorbed by the heat sink 16. The visible spectrum of light is reflected by the first mirror 14 to the first filter 26. The first filter 26 transmits red light which is reflected off the first surface 20 of the second mirror 18 to the third modulation plate 44. The cyan reflective path from the first filer 26 is separated by the second filter 28. The green light passes through the second filter 28 and is transmitted to the first modulation plate 32. The blue light is reflected by the second filter 28 to the second modulation plate 38. All light paths from the light source 12 to the liquid crystals are equidistant. The red beam of light exits the red liquid crystal and reflects off of the second mirror 18 to the third filter 30 where it is recombined with the reflected blue light. The green light from the first modulation plate 32 is reflected off the third mirror 22 to the third filter 30 where it is reflected and combined with the red and blue light. All three light beams are then sent to the fixed field stop 50. All light paths are equidistant from the liquid crystals to the field stop 50. All light paths are coaxial. All light beams are focused through the field stop 50, moving gobo 52 and gobo plate 54 and then focused to the nodal point of the projection zoom lens assembly 58. The lens assembly 58 has servo controlled lenses (not shown) which can focus and change magnification of the moving gobo 52 and/or the gobo plate 54 apertures.

The present invention has been described in an illustrative manner. It is to be understood that the terminology which has been used is intended to be in the nature of words of description rather than of limitation.

Obviously, many modifications or variations of the present invention are possible in light of the above teachings. Therefore, within the scope of the appended claims, the present invention may be practiced otherwise than as specifically described.

What is claimed is:

1. A device for generating a plurality of hues of color from a light beam emitted from a light source, comprising:

first mirror means for reflecting light having a wavelength below eight hundred nanometers and for transmitting light equal to or greater than eight hundred nanometers;

second mirror means spaced laterally from said first mirror means for reflecting light having a wavelength from six hundred to seven hundred nanometers;

third mirror means disposed between and spaced longitudinally from said first and second mirror means for reflecting having a wavelength from five hundred to six hundred nanometers;

means for receiving the light from either one of said first, second and third mirror means and transmitting the light having a wavelength between four hundred and five hundred nanometers and six hundred and seven hundred nanometers and reflecting the light having a wavelength between five hundred and six hundred nanometers to generate a hue of color of light;

first filter means disposed between said first and second mirror means and said receiving means for transmitting light having a wavelength between six hundred and eight hundred nanometers and reflecting light having a wavelength between four hundred and six hundred nanometers;

second filter means disposed between said first filter means and said third mirror means for transmitting light from said first filter means to said third mirror means having a wavelength greater than five hundred nanometers and reflecting light from one portion of said first filter means to another portion of said first filter means having a wavelength less than five hundred nanometers;

said receiving means transmitting light from said second mirror means and said first filter means, and reflecting light from said third mirror means;

said receiving means comprising third filter means spaced longitudinally from said second mirror means and said first mirror means and laterally from said third mirror means and placed in an optical path of light from said third mirror means at a substantially forty-five degree angle of incidence; and a heat sink placed behind said first mirror means to absorb light having a wavelength equal to or greater than said eight hundred nanometers passing through said first mirror means.

2. A device as set forth in claim 1 including a field stop placed in the optical path at a normal incidence to the light from said receiving means.

3. A device as set forth in claim 2 wherein said field stop includes means forming an aperture to allow only collimated light to pass therethrough.

4. A device as set forth in claim 1 wherein said first mirror means comprises a first mirror placed in the optical path of the light beam from the light source at a substantially forty-five (45) degree angle of incidence.

5. A device as set forth in claim 4 wherein said second mirror means comprises a second mirror placed in the optical path of the light beam from said first mirror at a substantially forty-five (45) degree angle of incidence.

6. A device as set forth in claim 5 wherein said second mirror has a reflecting surface coated with aluminum.

7. A device as set forth in claim 6 wherein the aluminum is coated with silicon dioxide.

8. A device as set forth in claim 7 wherein said third mirror means comprises a third mirror disposed between and spaced axially from said first and second mirrors and placed in the optical path at a substantially forty-five (45) degree angle of incidence to a light beam directed at said third mirror.

9. A device as set forth in claim 8 wherein said first filter means comprises a first filter placed in the optical path of the light beam from the first mirror at a substantially forty-five (45) degree angle of incidence.

10. A device as set forth in claim 9 wherein said second filter means comprises a second filter disposed between said first filter and said third mirror and placed in the optical path of the light beam from the first filter at a substantially forty-five degree angle of incidence.

11. A device as set forth in claim 10 including a first modulation plate disposed between said second filter and said third mirror for transmitting light between five hundred and six hundred nanometers in response to a predetermined electrical current.

12. A device as set forth in claim 11 including a second modulation plate disposed between said another portion of said first filter and said second filter for transmitting light between four hundred and five hundred nanometers in response to a predetermined electrical current.

13. A device as set forth in claim 12 including a third modulated plate disposed between said second mirror and said another portion of said filter for transmitting light between six hundred and seven hundred nanometers in response to a predetermined electrical current.

14. A device for generating a plurality of hues of color from a light emitted from a light source, comprising:

first mirror means for reflecting light having a wavelength below eight hundred nanometers and for transmitting light equal to or greater than eight hundred nanometers;

second mirror means spaced laterally from said first mirror means for reflecting light having a wavelength from six hundred to seven hundred nanometers;

third mirror means disposed between and spaced longitudinally from said first and second mirror means for reflecting light having a wavelength from five hundred to six hundred nanometers;

means for receiving the light from either one of said first, second and third mirror means and transmitting the light having a wavelength between four hundred and five hundred nanometers and six hundred and seven hundred nanometers and reflecting the light having a wavelength between five hundred and six hundred nanometers to generate a hue of color of light;

a field stop placed in an optical path at a normal incidence to the light from said receiving means;

said field stop including means forming an aperture to allow only collimated light to pass therethrough;

a heat sink placed behind said first mirror means to absorb light equal to or greater than said eight hundred nanometers passing through said first mirror means;

first filter means disposed between said first and second mirror means and said receiving means for transmitting light having a wavelength between six hundred and eight hundred nanometers and for reflecting light having a wavelength between four hundred and six hundred nanometers;

second filter means disposed between said first filter means and said third mirror means for transmitting light having a wavelength between five hundred and six hundred nanometers and for reflecting light from said first filter means having a wavelength between four hundred and five hundred nanometers;

said receiving means comprising third filter means spaced longitudinally from said second mirror means and laterally from said third mirror means and placed in the optical path of light from said third mirror means at a substantially forty-five degree angle of incidence;

first modulation plate disposed between said second filter means and said third mirror means for transmitting light between five hundred and six hundred nanometers in response to a predetermined electrical current;

a second modulation plate disposed between said first and second filter means for transmitting light between four hundred and five hundred nanometers in response to a predetermined electrical current; and a third modulation plate disposed between said second mirror means and said first filter means for transmitting light between six hundred and seven hundred nanometers in response to a predetermined electrical current.

\* \* \* \* \*